3,487,928
PROCESS FOR THE REMOVAL OF DISPERSED
DROPLETS OF OIL FROM WATER
Gerard P. Canevari, Cranford, N.J., assignor to Esso Research and Engineering Company, a corporation of Delaware
No Drawing. Continuation-in-part of application Ser. No. 584,673, Oct. 6, 1966. This application May 10, 1967, Ser. No. 637,371
Int. Cl. C02b 1/20; B01d 15/00
U.S. Cl. 210—40       9 Claims

ABSTRACT OF THE DISCLOSURE

Droplets of oil are separated from an aqueous phase using a mixture comprising a sodium montmorillonite clay and an agent selected from the class consisting of organic cationic agents and glycols. The organic cationic agent is preferably an amine.

The present invention is broadly concerned with the removal of finely dispersed droplets of oil from water in order to clarify the same. The invention is specifically concerned with a unique separation composition by which rapid, efficient, and complete separation of the oil droplets is secured from the water phase to produce a substantially oil-free water phase.

The present application is a continuation-in-part of Ser. No. 584,673 filed Oct. 6, 1966, inventor Gerard P. Canevari, entitled "Improved Oil Flocculating Clarifying Solution."

It is well known in the art that the separation of finely dispersed droplets of oil in water has been very difficult. For example, gravity separation requires large tanks due to the fact that the rate of gravity separation is relatively slow. In many instances, conventional separators are currently being operated at greater than design capacity resulting in oil droplets being entrained with the effluent which presents serious contamination and pollution problems. In accordance with the present invention, a unique, low cost, flocculating composition is utilized for water clarification. In essence, the composition of the present invention is a sodium montmorillonite clay used in conjunction with an additive selected from the class consisting of amines and glycols.

The sodium montmorillonite clay is unique with respect to other clays in that it has a very long length as compared with its thickness. This long chain structure provides sites for the very small dispersed oil droplets to adhere. These "bridged droplets" thus form a large agglomerate which very readily rises and forms a separate phase which can be removed from the clarified water phase. Sodium montmorillonite clay, in essence, has a three-layered structure. In many minerals, an atom of lower positive valence replaces one of higher positive valence. In the case of sodium montmorillonite clay, the trivalent aluminum ion, $Al^{+++}$, replaces the tetravalent silicon ion, $Si^{++++}$, in the outer tetrahedral sheets or layers. This is referred to as an isomorphic exchange. The surface layer, with $Al^{+++}$ now substituted for $Si^{++++}$, in a sense becomes less positive. To satisfy this deficit, the surface layer adsorbs a cation usually $Na^+$ or $Ca^{++}$, occurring in nature. In the case of cations, such as $Na^+$ (or $Ca^{++}$), they are too large to be accommodated in the lattice of the clay matrix. Thus, the $Na^+$ remains on the clay surface in an "exchangeable position," that is, in the presence of water, it may readily be exchanged by other cations present in the solvent. The total amount of these exchangeable cations is determined analytically and is expressed as the Cation Exchange Capacity (CEC) in units of milli-equivalents per 100 grams of clay. The cation exchange capacity of sodium montmorillonite clay is 108 milli-equivalents per 100 grams of clay.

The sodium montmorillonite clay when used with an organic cationic agent, preferably selected from the class consisting of amines and glycols, secures unexpected desirable results. The organic cationic agent is exchanged for the aforementioned exchangeable $Na^+$ cation, so that the lipophilic group associated with this ionized group provides a compatible site for the small, dispersed oil droplet. Organic compounds of the amine family are effective in such a manner. For example, the amine cation, $NH^+$, exchanges for the $Na^+$ cation and an organo-clay complex results possessing a multiplicity of lipophilic sites. The hydrocarbon portion of the amine may contain any number of carbon atoms in the molecule but a range of 6 to 18 is preferred. This hydrocarbon fraction may be completely linear or branched. This selection is based on considerations of (1) water solubility to enable the amine to complex with the clay in a water solution, and (2) length/strength of hydrocarbon chain to provide lipophilicity. The amine itself may be a primary, secondary, or a tertiary amine. Primary amines include methylamine, n-propylamine, isopropylamine, n-butylamine, isobutylamine, n-amylamine, isoamylamine, nn-hexylamine, n-heptylamine, n-octylamine, n-nonylamine, n-decylamine.

Secondary amines include dimethylamine, methylethylamine, diethylamine, di-n-propylamine, methyl-n-propyl-amine and di-n-butylamine. Tertiary amines include trimethylamine, dimethylethylamine, triethylamine, tri-n-propylamine and tri-n-butylamine.

Preferred amines are the so-called ethylene amines which now commercially include ethylene diamine, diethylene triamine, triethylene tetramine, tetraethylene pentamine and pentaethylene hexamine. Particularly preferred amines are water-compatible tetraethylene pentamine and/or diethylene triamine.

Higher molecular weight amines that are not water soluble may also be used by reacting them with acid such as hydrochloric or acetic acid, to give the amine salts. They react in a manner similar to the reaction of fatty acids with alkali to yield soap. However, instead of yielding high molecular weight anions ($RCOO^-$) as with soap, the amine salts yield colloidal exchangeable cations ($RNH^+$). Further, the amine salts are water soluble. Such a high molecular weight, water insoluble amine, is Geigy Amine O (Geigy Industrial Chemicals, Saw Mill River Road, Ardsley, N.Y.) which has a molecular weight of 355 and may be represented:

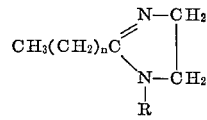

wherein $n$ is from about 12 to 18, such as 15, and R is a relativley low molecular wt. substituent such as an alkyl group having from about 1 to 10 carbon atoms.

The Geigy Amine O may be reacted with hydrochloric or oleic acid to yield the water-soluble amine salt. For example, 100 parts of Geigy Amine O may be reacted with 80 parts of oleic acid to yield Amine O-oleate. This salt may then be used in the same manner as the water-soluble amines previously cited.

In general, these high molecular weight amines have properties as follows.

|  | Amine | | |
|---|---|---|---|
|  | A | B | C |
| Molecular weight | 276 | 355 | 360 |
| Melting Point (° C.) | 32 | ca. 5 | 42 |
| Specific gravity | 0.98 | 0.95 | 0.97 |
| Surface tension 0.1% in 1% HCl (d./cm.) | 29 | 31 | 33 |

The amines are moderately strong monovalent tertiary amine bases; they react with acids to give amine salts in a manner analogous to the reaction of fatty acids with alkali to yield soap:

$$CH_3(CH_2)_nCOOH + NaOH \longrightarrow CH_3(CH_2)_nCOO' + Na^+ + H_2O$$

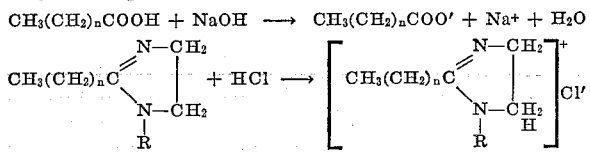

The free amine base (like the fatty acid) is soluble in organic solvents and relatively insoluble in water; the acid salts of the amines, hydrochloride, acetate, etc., like the alkali soaps are water soluble and soaplike in nature; that is, they possess colloidal properties, with good foaming, wetting and dispersing action at neutral and acid pH's. The water soluble salts of high molecular weight amines are usually characterized as "invert soaps." While soaps yield colloidal solutions containing high molecular weight anions (RCOO'), the amine salts yield colloidal cations ($R_3NH^+$) and are, therefore, classified as cationic agents. This essential difference in the nature of the electrical charge of the colloid accounts for many of the unique properties and applications of these amines. The amines contain no inorganic salts or solvents. Although they are not pure compounds, the impurities in the amines are also surface active.

These amines are stable on storage, although there may be some stratification at temperatures near the melting point. Aqueous solutions are stable at neutral and acid pH's. Exposure of the amines to moisture or carbon dioxide in the atmosphere should be avoided as these will react with the free bases. This reaction may be reversed by heating at 150–200° C. The free amine bases have excellent heat stability and may even be distilled with relatively little decomposition at temperatures in excess of 200° C. in vacuum. On heating amine salts of volatile organic acids such as acetic or formic, the acid component will volatilize leaving the amine base as a residue. Like amines generally, these amines are sensitive to oxidizing agents such as peroxide and hypochlorite. Their chemical reactivity is characteristic of tertiary amines; they combine with alkyl halides, such as methyl chloride or ethyl chloride, yielding quaternary ammonium compounds.

The amount of amine used based upon the clay is from about 1 part by weight of the amine to about 1 to 80 parts by weight of the clay. If the mixture is to be used with fresh water, a very satisfactory composition is about one part by weight of amine to 20 to 50 parts by weight of the clay. If the composition is to be used for the clarification of salt water, a satisfactory composition is from about 1 part by weight of an amine to about 20 to 50 parts by weight of the clay. A very desirable formulation for use with fresh water is 40 parts by weight of montmorillonite clay per one part by weight of tetraethylene pentamine. A very desirable formulation for the treatment of sea water is 30 parts by weight of montmorillonite clay per one part of tetraethylene pentamine.

Under certain circumstances very effective compositions are secured by utilizing aluminum sulfate ($Al_2(SO_4)_3$), in combination with the clay and amine. The $Al_2(SO_4)_3$ used based upon the clay, should be in the range from about 0.5–4 parts of $Al_2(SO_4)_3$ per part of clay, preferably about 2 parts by weight of aluminum sulfate.

The flocculating clarifying solution may be prepared by adding 1 to 5 wt. percent of the clay to water. The additives previously discussed are likewise added to this solution in appropriate amounts based on the amount of clay. The resulting flocculating clarifying solution is then added to the oily water to be clarified. The amount of solution added will vary somewhat based on the amount of oil contaminant. However, the range of effective dosages would represent the addition of 10 to 100 w.p.p.m. of clay such as about 50 p.p.m. of clay (based on the oily water to be clarified).

$Na^+$ montmorillonite clay will also admit organic compounds of an ionic nature between the unit layers. The adsorption of organic compounds by this mechanism similarly produces organo-clay complexes with sodium montmorillonite clay. Compounds of the glycol family are effective in this instance and after interlayer adsorption provide lipophilic sites as in the case of the amine additive.

The water-soluble glycols are almost unversally applicable and can range from ethylene glycol (mol. wt.=62), propylene glycol, and polyglycols. Examples of such polyethylene glycol compounds are those made by the Dow Chemical Company such as polyglycol E 200: mol. wt.=200; $HO(C_2H_4O)_n C_2H_4OH$; and polyglycol E 600: mol. wt.=600; $HO(C_2H_4O)_n C_2H_4OH$. Examples of such polypropylene glycol compounds are those made by the Dow Chemical Company such as polyglycol P 400: mol. wt.=400 $HO(C_3H_6O)_n C_3H_6OH$; and polyglycol P 4000: mol. wt.=4000 $HO(C_3H_6O)_n C_3H_6OH$.

An example of a particular effective material is Dow Chemical Company's Polyglycol 112–2, which is a polypropylene glycol triol modified to have a primary terminal hydroxyl group. Properties of Polyglycol 112–2 are as follows:

| | |
|---|---|
| Average molecular wt. | 4500 |
| Specific gravity 25/25° C. | 1.023 |
| Pounds/gal. at 25° C. | 8.51 |
| Refractive index at 25° C. | 1.454 |
| Pour point, ° F. | −18 |
| Flash point, ° F. | 485 |
| Fire point, ° F. | 520 |
| Viscosity, cks.: | |
| 32° F. | 4017 |
| 77° F. | 659 |
| 100° F. | 400 |
| 210° F. | 50 |
| Viscosity index | 134 |
| Approx. sol. g./100 g. solvent at 25° C.: | |
| Water | <0.1 |
| Methanol | >100 |
| Ether | >100 |

The amount of glycols utilized is about one part by weight of glycol to 40 parts by weight of clay. A preferred formulation when utilizing Polyglycol 112–2 with respect to salt water is 5 to 20 parts by weight of clay as, for example, 10 parts by weight of clay to one part by weight of Polyglycol 112–2.

In order to further illustrate the invention, a number of solutions were prepared and tested. The solutions prepared are listed in the following table.

| Mixture | Additive | Additive, parts by wt. | Clay, parts by wt. | $Al_2(SO_4)_3$ Alum |
|---|---|---|---|---|
| A | Tetraethylene pentamine | 1 | 6.0 | |
| B | do | 1 | 2.5 | |
| C | Diethylene Triamine | 1 | 3.0 | |
| D | do | 4 | 1.0 | 0.5 |
| E | Geigy amine O-oleate | 1 | 12.0 | 6.0 |
| F | Dow Polyglycol 112–2 | 1 | 10.0 | |
| G | Pentaethylene hexamine | 1 | 20.0 | |
| H | Tetraethylene Pentamine | 1 | 40.0 | |
| I | do | 1 | 30.0 | |

Mixtures A and B were the most generally effective, mixture A for fresh water wherein the addition of an amount representing 30 w.p.p.m. of clay (based on the oily water to be clarified) readily clarified an oily water containing 10,000 w.p.p.m. of oil within 2 to 3 minutes.

The oily water would otherwise require more than 24 hours of gravity settling for complete clarification. Mixture B, containing a greater amount of additive (based on clay), was similarly effective for salt water. Mixture C effectively clarified fresh water oily dispersions in a similar manner but it can be noted that for the same clay addition, more additive is required. The same comment applies to Mixture D but in this instance, the composite formulation was effective for salt water oily dispersion. Mixtures E and F were also found to clarify salt water oily dispersions in a similar rapid and effective manner. As mentioned, the optimum clay dosage can be varied (10 to 100 p.p.m.) such as about 50, based on the oil content of the contaminated water.

In an actual field test in an oil producing field, it was demonstrated that the oil contaminated fresh formation water was completely clarified in less than one minute by 50 parts per million of solution H, whereas the untreated control sample still retained a major portion of the oil contaminant dispersed throughout, after more than 2 hours of gravity settling. Also in actual tests with tank ship oil contaminated ballast water (salt) as well as a refinery oil contaminated water effluent (salt), solution I as well as solution F were very effective.

What is claimed is:

1. Process for the removal of dispersed droplets of oil from fresh water containing the same which comprises treating said fresh water with a flocculating-clarifying solution comprising about 40 parts by weight of sodium montmorillonite clay and about 1 part by weight of tetraethylene pentamine to agglomerate said droplets of oil, allowing said agglomerates to rise and form a separate oil phase and thereafter separating an oil-free water phase.

2. Process for the removal of dispersed droplets of oil from sea water containing the same which comprises treating said sea water with a flocculating-clarifying solution comprising about 30 parts by weight of sodium montmorillonite clay and about 1 part by weight of tetraethylene pentamine to agglomerate said droplets of oil, allowing said agglomerates to rise and form a separate oil phase, and thereafter separating an oil-free water phase.

3. Improved process for the removal of dispersed droplets of oil from water containing the same which comprises preparing a flocculating-clarifying solution comprising a sodium montmorillonite clay and an organic agent which comprises a polypropylene glycol triol modified to have a primary terminal hydroxy group, thereafter treating said water with said flocculating-clarifying solution to remove said droplets of oil and thereafter separating an oil-free water phase, the amount of clay being added in the range from about 10 to 100 w.p.p.m. based on the oily water being clarified.

4. Improved process for the removal of dispersed droplets of oil from water containing the same which comprises preparing a flocculating-clarifying solution by separately adding to water 1 to 5 wt. percent of a sodium montmorillonite clay and an agent selected from the class consisting of organic cationic agents and glycols, thereafter treating said water containing said dispersed droplets of oil with said flocculating-clarifying solution, whereby agglomerates will form and rise to form a separate oil-containing phase, removing said oil-containing phase to secure an oil-free water phase, the amount of clay added to said water containing said droplets of oil being in the range of from about 10 to 100 w.p.p.m. based upon said water containing said droplets of oil.

5. Process as defined by claim 4 wherein said organic cationic agent is an amine, the amount of amine added being in the range from about 1 part by weight of the amine to about 1 to 80 parts by weight of the clay.

6. Process as defined by claim 5 wherein said organic cationic agent is tetraethylene pentamine.

7. Process as defined by claim 5 wherein said organic cationic agent is diethylene triamine.

8. Process as defined by claim 4 wherein said organic cationic agent is a high molecular weight, water-insoluble amine having a molecular weight in the range from about 276 to 360 which has been reacted with an acid to form a salt.

9. Process as defined by claim 4 wherein said organic cationic agent is an amine, the amount of amine added being in the range from about 1 part by weight of amine to about 20 to 50 parts by weight of the clay.

References Cited

UNITED STATES PATENTS

| | | | |
|---|---|---|---|
| 2,623,853 | 12/1952 | Stross | 252—28 |
| 2,795,545 | 6/1957 | Gluesenkamp | 252—28 |
| 3,046,233 | 7/1962 | Levy | 252—323 X |
| 3,169,118 | 2/1965 | Kirkpatrick et al. | 252—344 X |
| 3,210,274 | 10/1965 | Caruso. | |
| 3,227,657 | 1/1966 | Haden et al. | 106—308 X |
| 2,367,384 | 1/1945 | Tymstra et al. | 210—36 |
| 3,234,006 | 2/1966 | Sawyer et al. | |

MICHAEL E. ROGERS, Primary Examiner

U.S. Cl. X.R.

210—36, 44, 51; 252—323